United States Patent [19]

Pickens, Jr. et al.

[11] 4,342,802
[45] Aug. 3, 1982

[54] FLOOR COVERING OF NEEDLED WOVEN FABRIC AND NONWOVEN BATT

[75] Inventors: Robert C. Pickens, Jr., Gurnee; Patricia R. Kirchherr, Grayslake; Reese R. Thomas, Libertyville, all of Ill.

[73] Assignee: Ozite Corporation, Libertyville, Ill.

[21] Appl. No.: 222,171

[22] Filed: Jan. 2, 1981

[51] Int. Cl.³ ............................................. B32B 5/06
[52] U.S. Cl. ................................... 428/92; 156/72; 428/95; 428/234
[58] Field of Search .................... 428/92, 95, 234; 156/72

[56] References Cited

U.S. PATENT DOCUMENTS

| | | | |
|---|---|---|---|
| 1,651,535 | 12/1927 | McDermott | 428/234 |
| 1,726,634 | 9/1929 | Smith | 428/234 |
| 2,706,324 | 4/1955 | Cogovan | 428/95 |
| 3,347,736 | 10/1967 | Sissons | 428/234 |
| 3,348,993 | 10/1967 | Sissons | 428/234 |
| 3,819,465 | 6/1974 | Parsons | 428/234 |
| 4,144,366 | 3/1979 | Lewis | 428/234 |

*Primary Examiner*—Marion McCamish
*Attorney, Agent, or Firm*—Wegner, McCord, Wood & Dalton

[57] ABSTRACT

A floor covering is provided which has a woven fabric needle punched to a face surface of a non-woven batt of staple fibers. The woven fabric has either warps of polypropylene ribbons and fillings of continuous filaments, ribbon yarns, or spun staple fibers or vice versa. The needle punching forms a covering layer of fibers on the facing surface of the woven fabric. In one form of the invention, the needled batt and woven fabric is texturized from the batt side of the woven fabric which forms loops outwardly of the plane of the woven fabric which loops include fibers from the non-woven batt and varying amounts of filaments, ribbon yarns, or spun staple fibers from the woven fabric. A back is affixed to the batt as by fusing, latexing, foaming, needling, or the like. In another form of the invention, the needled batt and woven fabric are texturized from the woven fabric side of the batt which forms loops outwardly of the plane of the batt. The loops contain fibers from the batt and from the filaments, ribbon yarns, or spun fibers. In this form of the invention, the woven fabric serves also as a woven backing for the floor covering. A novel method of making a floor covering is disclosed and comprises needling the non-woven batt, attaching the woven fabric which has either warps or fillings, containing bundles of continuous filaments, ribbon yarns, or spun staple fibers to the batt to provide a covering layer to the batt, texturizing loops from the non-woven fibers of the batt and from the continuous filaments, ribbon yarns, or spun staple fibers of the woven fabric to define rows of loops on the floor covering which has a random pattern of individual loops or clusters of loops of a color contrasting with the color of the batt. The floor covering has an appropriate backing formed thereon or attached thereto.

11 Claims, 10 Drawing Figures

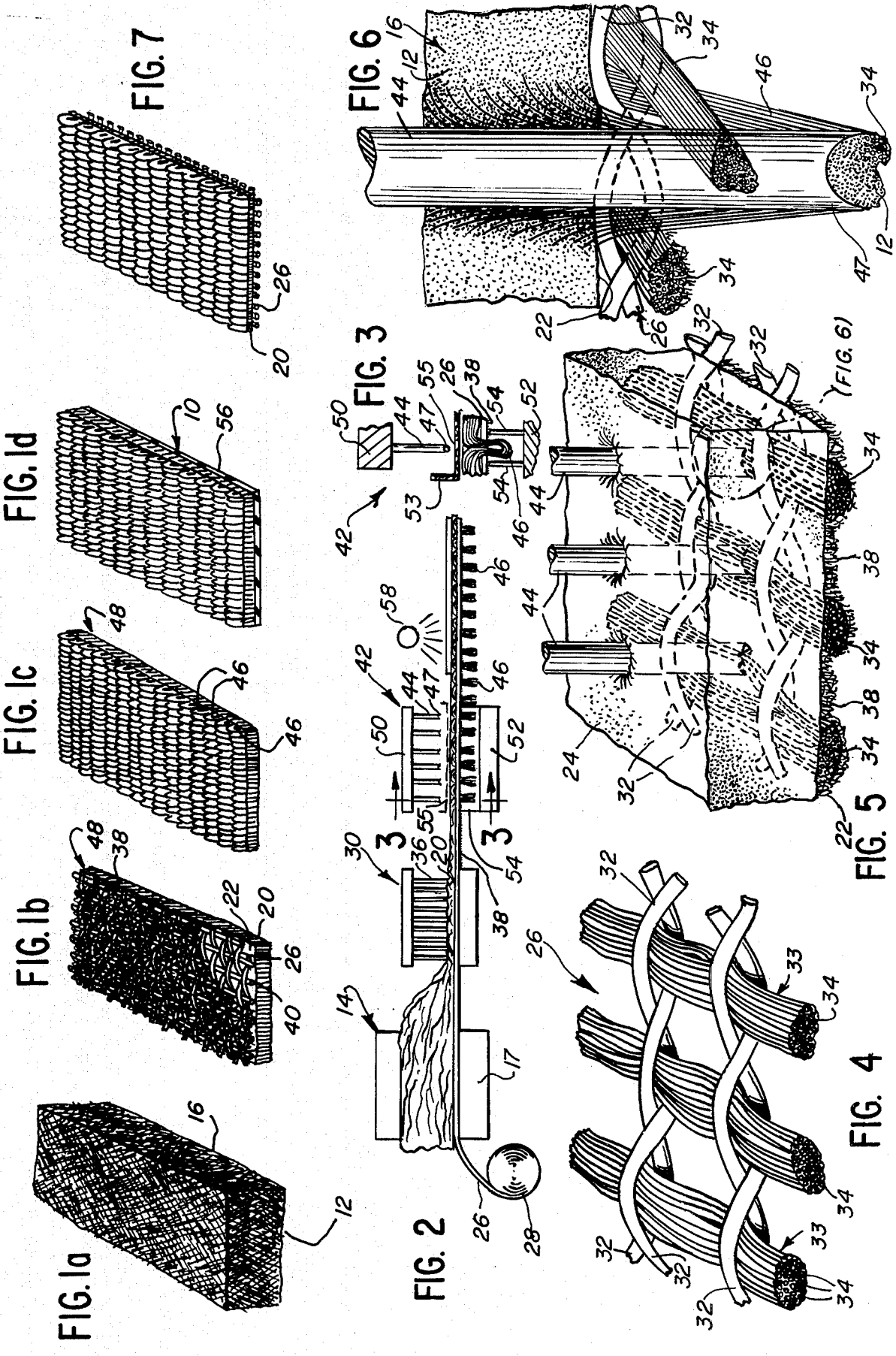

4,342,802

FLOOR COVERING OF NEEDLED WOVEN FABRIC AND NONWOVEN BATT

TECHNICAL FIELD

This invention relates primarily to a floor covering and a method of making same and, more particularly, to a floor covering having a woven fabric which contributes stability and a contrasting color to the final product.

BACKGROUND ART

Currently, certain types of floor coverings are made using staple fibers that are flat needle punched with or without a woven backing. The woven backing may be a woven fabric, a ribbon scrim, or the like, all of which backings are used primarily for stability and strength. Heretofore, floor coverings made of needle punched staple fibers with a woven backing have never made use of the color of the threads or fibers or ribbons of the woven backing as part of the face coloration or of the decorative effect portrayed by the floor covering.

A desirable styling feature of a floor covering is the provision of individual tufts (loops) or clusters of tufts (loops) which have a color contrasting with the color of the majority of surrounding tufts (loops). To get this feature with current processes requires that the floor covering be a tufted product where the individual tufts or clusters of tufts of contrasting colors are created by interjecting different color yarns in the tufting apparatus to get the randomly scattered tufts or clusters of tufts of contrasting colors. Tufted floor covering is generally more expensive to manufacture.

In the plain or flat needle punched floor covering currently available, the nearest approach to the feature of contrasting colors on the face surface of the floor covering results from using a blend of colorations of the non-woven fibers in the batt such that when the blended fiber batt is flat needle punched, the resulting floor covering has a homogenous, even heather look. The same even heather look is produced by other processing methods operating on the blended staple fiber batt such as a textured or structured needle punch process. Although the homogenous, even heather look is desirable and much used, it does not have the desired styling feature of the unevenly spaced or scattered individual tufts or clusters of tufts attained in tufted floor covering.

The present invention is directed to overcoming one or more of the problems as set forth above.

DISCLOSURE OF INVENTION

In one preferred form of the invention, a floor covering is provided that includes a unique woven fabric having warps and fillings with either the warps or the fillings comprised of continuous filaments of ribbon yarn, or of spun staple fibers. The woven fabric is needle punched to a face surface of a needled batt of staple fibers to provide the batt with a covering layer of fibers and/or filaments needled from the batt and from the woven fabric to produce a covered composite which is then texturized through the batt and then through the woven fabric to produce a texturized composite. The texturized composite includes closely adjacent texturized loops substantially covering the woven fabric.

In the event that the filling of the woven fabric is comprised of the bundles of filaments, or of ribbon yarns, or of spun staple fibers, the texturizing needles, open in the cross machine direction, will first pick up some of the staple fibers of the batt and will, in most cases, then pick up some of the filaments, or some of the ribbon yarns, or some of the spun staple fibers of the filling of the woven fabric in a random fashion and will push said fibers and filaments, or ribbon yarns, or spun fibers into loops projecting from the plane of the woven fabric. By using selected and desired colors in the filling filaments or ribbon yarns or spun staple fibers, which colors will contrast with the base color of the fibers in the batt, will result in a finished floor covering having random individual loops and clustered loops of contrasting color randomly scattered throughout the surface of the floor covering.

In the event that the warp of the woven fabric is comprised of the bundles of filaments, or ribbon yarns, or spun staple fibers, the texturizing needles, open in the machine direction, will first pick up some of the staple fibers of the batt and will, in most cases, then pick up some of the filaments, or ribbon yarns, or spun staple fibers of the warps of the woven fabric in a random fashion and will push said fibers and either the filaments, or ribbon yarns, or spun fibers into velour loops projecting from the plane of the woven fabric. By using selected colors in the warp filaments, ribbon yarns or spun staple fibers, which colors will contrast with the color of the non-woven fibers in the batt, will result in a finished floor covering having random loops and clustered loops of contrasting color randomly scattered throughout the velour surface of the finished product.

In a modified form of floor covering, the covered composite comprising the woven fabric needle punched to the face surface of the needled batt, is inverted and fed to the texturizing apparatus with the texturizing needles penetrating first through the woven fabric and then through the needled batt. The principles discussed above for how the texturizing needles pick up either filling yarns or warp yarns to create the random loops apply equally to the modified form of floor covering. One advantage to the woven fabric being on the back of the needled batt is that it can serve also as a backing fabric thereby reducing the manufacturing costs.

The woven fabric provides dimensional stability resulting in less shrinkage and/or stretch during processing which is an advantage both in processing as well as in the final product. Either the filling or the warp of the woven fabric becomes part of the pile structure to afford a desired random loop or velour surface. The woven fabric makes it possible to reduce the length of the staple fibers to get a denser pile with better wear characteristics and at a lower cost. With the woven fabric, it is now possible to get a higher percent face weight with all of the attendant advantages therefrom.

BRIEF DESCRIPTION OF DRAWINGS

FIGS. 1(a) to 1(d) illustrate, in perspective views, successive stages of manufacture of the improved floor covering;

FIG. 2 illustrates a schematic, fragmentary manufacturing line for practicing the method of the present invention;

FIG. 3 is an enlarged broken away cross-sectional view taken along the line 3—3 of FIG. 2;

FIG. 4 is an enlarged perspective view of one form of woven fabric for use in the manufacture of the improved floor covering;

FIG. 5 is a perspective view taken from above showing the needles of the texturizing loom passing through and picking up fibers of the batt and picking up filaments or spun fibers of the woven fabric;

FIG. 6 is a perspective enlarged bull's-eye view of one needle of FIG. 5 as it passes through the batt and as it picks up some of the filaments or spun fibers of the woven fabric; and FIG. 7 shows a modified form of wall covering embodying the invention.

BEST MODE FOR CARRYING OUT THE INVENTION

Referring to the drawings and, in particular, to FIGS. 1(a) to 1(d) and to FIG. 2, the various stages in the manufacture of the improved floor covering 10 of FIG. 1(d) are illustrated. The orientation of the illustrations of the floor covering at the stages in FIGS. 1(a) to 1(d) are inverted from the orientation of the illustrations at the various stages of the manufacture shown in FIG. 2. Prior to the subject matter illustrated in FIG. 1(a), non-woven staple fibers 12 are processed in a conventional fashion to form a web of fibers (not shown), which web is then lapped in a conventional lapper 14 to form superimposed unneedled layers 16 of the web of staple fibers, FIG. 1(a). As shown in FIG. 2, woven fabric 26 is fed from a roll 28 onto a conveyor 17 under the lapper 14. The web of staple fibers is continuously lapped on the woven fabric so that the two enter a conventional needleloom superimposed one on the other. The needleloom needles the layers of webs of fibers into a batt 20 and at the same time needles the fibers into the woven fabric 26 to such a degree that the woven fabric 26 is only slightly visible on one side of the batt.

One form of woven fabric 26, a small piece of which is shown in FIG. 4, has a leno weave with the warps being comprised of polypropylene ribbons 32 intertwining around the fillings which are comprised of ends or bundles 33 of continuous filaments, ribbon yarns, or spun staple fibers 34 extending transverse to said warps. The preferred woven fabric 26 has fillings with three to ten ends per inch and have warps with six to eighteen ends per inch. Each end or bundle of continuous filaments 33 has 50 to 110 filaments, with the spun yarns having an equivalent size, with the total size of the yarns 34 being equivalent to 900 to 5000 denier. The DPF (Denier Per Filament) is in the range of 10 to 20 for the BCF yarns and the same for the staple spun fibers. The denier of the polypropylene ribbons for the warp or filling 32 is 300 to 1200 and the color of the ribbons should be monochromatic with the batt fiber. As shown, the woven fabric 26 was fed into contact with the layers 16 of non-woven staple fibers, with the ribbons 32, forming the warps, lying in the machine direction and with the buncles 33 of filaments, ribbon yarns, or spun staple fibers 34, forming the fillings, lying in the cross-machine direction. The needles 36 of the needleloom 30 will render to the layers 16 of non-woven staple fibers and to the woven fabric, a relatively large number of needle punches per square inch. It has been found that the number of needle punches per square inch may vary from 600 to 1500 to produce the desired end result. The barbed needles 36 of the needleloom 30 will penetrate the batt 20 and woven fabric 26 so as to produce a covering layer 38 on the outer face of the woven fabric 26, said covering layer 38 being made up of both fibers 12 from the batt 20 and filaments, ribbon yarns, or spun staple fibers 34 from the woven fabric 26. The batt 20 and woven fabric 26 with the covering layer 38 on the surface of the fabric 26 is, for the purposes of this disclosure, called a composite 40 illustrated in FIG. 1(b). The needle punching of the batt 20 and/or the woven fabric 26 serves several purposes, first of which is to condense the bulk of the batt 20 to give strength and integrity to the batt and second of which is to attach the woven fabric 26 to the front face surface 22 of the batt 20 so that the woven fabric 26 is barely visible through the covering layer 38. As the woven fabric 26 is attached, fibers of the batt 20 are punched through the woven fabric to produce the covering layer 38 (FIG. 1b), which layer 38 is not so much to hide the woven fabric 26 as it is to provide an even appearing surface. The extent of the needle punching of the batt 20 to the woven fabric 26 is determined, in part, by the desire to eliminate "grinning" through or between the ultimate loops or tufts (to be described hereinafter). To a large extent, the extent of the needle punching for tacking the woven fabrics 26 to the batt 20 is determined by the type of material being used.

FIG. 1(b) illustrates the batt 20 and woven fabric 26 needled to a point where the covering layer 38 barely obscures the woven fabric. The lower right-hand corner to FIG. 1(b) has the covering layer 38 broken away, in part, to reveal the woven fabric 26, and the woven fabric 26 is broken away, in part, to reveal the front face surface 22 of the batt 20.

The composite 40 continues along the processing line (FIG. 2) with the batt 20 superimposed on the woven fabric 26 and with the covering layer 38 facing downward and enters a texturizing needleloom 42. The texturizing needles 44 of the loom 42 are spaced from each other in both the machine direction and in the cross-machine direction with the rows of needles in the machine direction aligning with each other so as to produce straight rows of loops 46 closely adjacent to and, in fact, abutting adjacent rows of loops 46. Each needle 44 of the loom 42 has a fork tip 47 which is open in the cross-machine direction and which penetrates through the back surface 24 and picks up staple fibers 12 in the batt 20 and pushes said fibers 12 against aligned filaments 34 in the filling of the woven fabric 26 (FIGS. 5 and 6). Continued movement of the needle 44 will form the loops 46 which may be made up of non-woven fibers 12 from the batt 20 and from filaments, ribbon yarns, or spun staple fibers 34 from the filling strands of the woven fabric 26. The locations of the needles 44 in the needleloom 42 are such that the texturized composite 48, as it emerges from the needleloom 42, will have closely abutting adjacent rows of loops 46 which substantially, completely cover the covering layer 38 on the woven fabric 26 on the batt 20. Flexing or bending the texturized composite 48 will open up a space between loops 46, but the covering layer 38, being formed on the same non-woven fibers 12 and filaments, ribbon yarns, or spun staple fibers 34, will not show any color discontinuity with the color of the loops 46. It may be desirable to have a color shading between the color of the loops 46 and the color of the covering layer 38 as long as there is not a sharp contrast in color between the two.

As shown in FIGS. 2 and 3, the needle board 50 of the texturizing loom 42 reciprocates up and down relative to the bed plate 52 of the loom. A stationary stripper plate 53 is located so that it has an aperture 55 aligned with each needle 44 of the needle board 50. Lamellas 54 are positioned on the bed plate 52, FIG. 3, and are aligned parallel to the machine direction in accordance with the space between the parallel rows of needles 44 so as to provide a backing for the composite 40 to assist in the formation of the adjacent rows of loops 46.

The texturized composite 48 is provided with an appropriate backing 56 which is added on the back surface 24 of the batt 20 as by latexing, or the like, to stiffen the fabric and to anchor or secure the fibers of the loops 46 and the fibers 12 of the batt 20 together. As shown in FIG. 2, a spray applicator 58 sprays latex, or the like, on to the back surface 24 to form the backing 56. A heated roller (not shown) could be substituted for the applicator 58 to fuse the fibers 12 in proximity thereto together to form the backing 56. The backing 56 adds stiffness and body to the floor covering 10 to aid in the handling and use of the floor covering. The backing 56 may be latex, as mentioned above, may be latex and foam, where the foam may be applied in a liquid form, or may be in the form of a sheet material, such as jute, which is adhered in a conventional applicator to the back surface 24 of the batt 20.

In another form of the invention, the woven fabric 26 may have the warps comprised of bundles of filaments, ribbon yarns, or spun staple fibers 34 with the fillings comprised of ribbon 32 (such as a polypropylene ribbon). The denier of the continuous filaments, ribbon yarns, or spun staple fibers 34, when forming the warp of the fabric, would be in the range of 900 to 2600. In this form of invention, the needles 44 of the texturizing loom 42 have the needle tips 47 open in the machine direction so that the needles 44 will pick up staple fibers 12 from the batt 20 and will pick up aligned warp filaments, ribbon yarns, or spun staple fibers 34 to form velour loops 46 (loops open in the cross-machine direction). Linear patterns in the machine direction may be produced therefrom. Such patterns may include stripes or plaids which have a continuous stripe in the machine direction.

The texturizing needleloom 42 is one important element of the successful practice of the present invention. As shown in FIGS. 2, 3, 5 and 6, the fork tips 47 of the needles 44 of the texturizing loom 42 are open in the cross-machine direction with the opening lying parallel to the filling filaments, ribbon yarns, or spun staple fibers 34 of the woven fabric 26. The forked tips 47 of the needles 44, after picking up a quota of staple fibers 12 from the batt 20, will pick up some of the aligned continuous filaments, ribbon yarns, or spun staple fibers 34 of the filling of the woven fabric 26 and together the fibers 12 and filaments, ribbon yarns, or spun staple fibers 34 will be pushed into loops 46 projecting outwardly from the plane of the woven fabric 26.

FIGS. 5 and 6 illustrate, in a fashion, how the fork tips 47 of the needles 44 of the needleloom 42 are operating. In FIG. 5, the ribbons 32 of the woven fabric 26 lie in the machine direction and support the fillings, which are in the form of bundles 33 of continuous filaments, ribbon yarns, or spun staple fibers 34 lying in the cross-machine direction. The opening of each fork tip 47 of a needle 44 penetrates the back surface 24 of the batt 20, picks up a group or quota of staple fibers 12 lying in the path of the needle 44 and as it breaks through the front face surface 22 of the batt 20, it will pick up transversely aligned filaments, ribbon yarns, or spun staple fibers 34. Each needle 44 will then push the fibers 12 and filaments, ribbon yarns, or spun staple fibers 34 into the loops 46 projecting transversely to the plane of the woven fabric 26. Some needles will miss the filling yarns 34 of the woven fabric 26 altogether in which case only staple fibers 12 of the batt 20 will form that particular set of loops 46. The needles 44 are spaced close enough together in the cross-machine direction that aligned rows of needle punches will produce a dense enough surface coverage to eliminate the visibility of the woven fabric.

The woven fabric 26 is selected to include a desired color in the filling bundles 33 of filaments, ribbon yarns, or spun staple fibers 34. The needled batts 20 can be made of a few basic colors with one color being usable as the base color for many different end color effects. By selecting one or more contrasting colors for the filling bundles 33 of filaments, ribbon yarns, or spun staple fibers 34 of the woven fabric 26, which woven fabric will be needled to the batt 20, an end color effect can be created from the texturizing operation. The finished surface of the floor covering 10 will have the base color of the batt 20 interspersed with random and clustered batches of fibers of the contrasting color of the filling of the woven fabric creating a pleasing appearing floor covering.

Either the warp or the filling filaments, ribbon yarns, or spun staple fibers 34 will provide the accent color for the end product which will have a denser face yarn due to the added fibers in the loops afforded by the use of shorter staple fibers in the batt and by the filling filaments, ribbon yarns, or spun staple fibers 34. The use of shorter staple fibers provides a higher density of fibers in the pile which results in improved wear, improved resilience and improved aesthetics.

The woven fabric 26 tends to form a barrier between the face surface 22 of the batt 20 and the pile which will prevent wicking of the fiber lock backing latex to the pile surface of the batt during application, thereby assuring that the pile surface is uniformly soft. The floor covering surface pile has a better textile feel, a softer hand.

EXAMPLE 1

A woven fabric 26 is provided with a leno weave having warps of polypropylene ribbons 32 having a denier of 500 and fillings of 8 ends or bundles 33 per inch of BCF (bulk continuous filament) filaments with roughly seventy individual fibers or filaments per end or bundle and with a DPF (Denier Per Filament) of 15. Each end or bundle of the filling has a total denier of 1800. The bundles of BCF filaments have a dark brown color. The web of staple fibers is made up of fibers of 1½" lengths which are a buff color and the woven fabric 26 is needle punched 1000 punches per square inch to provide a covering surface 38 obscuring the woven fabric 26. The texturizing loom 42 texturizes the composite 40 to produce rows of loops 46 which have individual loops or clusters of loops of dark brown interspersed with the buff colored background loops. The texturized composite 48 has a backing 56 applied thereto, such as a layer of latex. The resulting floor covering has the appearance of an expensive tufted floor covering.

In still another preferred embodiment, a finished form of which is shown in FIG. 7, the construction of the woven fabric 26 and process of attaching the fabric 26 to the batt 20 is identical to that already described. The difference begins when the batt 20 and attached fabric 26 is fed to the texturizing apparatus with the woven fabric 26 up and the batt 20 down, so that the texturizing needles penetrate into the woven fabric side of the batt first. In the texturizing apparatus, the fork needles strike the woven fabric 26 forcing the filling yarn through the batt 20 of fiber to form loops for the face of the material. The resulting face appearance has approximately 50% less filling filaments, ribbon yarns, or spun fibers 34 than the previously described method of texturizing. Inconsistencies of fiber description in the batt 20 is greatly minimized and the woven fabric 26 on the back surface of the floor covering acts like a secondary backing and requires only a layer of latex for a finished product thus reducing the manufacturing cost. The marginal width of the resulting floor covering is very consistent since the material expands or widens about 5% during the texturizing process.

The ability to control the contrasting color or shade of a floor covering is an important styling tool that can be used on a less expensive floor covering while retaining the expensive appearance. That is, heretofore, to obtain a desired contrasting color effect it was necessary to use a tufted carpet which was inherently more expensive to make than a non-woven floor covering. Now it is possible to have a non-woven floor covering using the unique woven fabric during the texturizing of the product which produces the desired color effect at a relatively inexpensive price. It is now possible for a non-woven floor covering to be competitive with a tufted floor covering in style and coloring and is, therefore, attractive to designers and to stylists.

Other aspects, objects and advantages of this invention can be obtained from a study of the drawings, the disclosure and the appended claims.

We claim:

1. A floor covering comprising:
   a needled batt of non-woven staple fibers having a predetermined color,
   a woven fabric having either the warps or the fillings comprised of continuous filaments, ribbon yarns, or spun fibers having a color contrasting with the color of the staple fibers, said woven fabric being needled to a face surface of said batt, and
   rows of loops of staple fibers projecting from said batt and from said woven fabric,
   some of said loops include portions of said continuous filaments, ribbon yarns or spun fibers with the color of the filaments interspersed with the color of the needled batt providing the floor covering with individual loops or clusters of loops of color contrasting with the color of the fibers of the non-woven batt.

2. A floor covering as claimed in claim 1, wherein said warps are leno woven ribbons of polypropylene and said fillings are bundles of continuous filaments.

3. A floor covering as claimed in claim 1, wherein said batt of non-woven staple fibers and said woven fabric are needle punched together to form a surface covering on said woven fabric sufficient to obscure the woven fabric.

4. A floor covering comprising:
   a needled batt of non-woven staple fibers having a predetermined color,
   a woven fabric having fillings comprised of bundles of continuous filaments having a color contrasting with the color of the staple fibers and having warps of ribbon construction, said woven fabric being needled to a face surface of said batt to provide a covering layer of fibers on said woven fabric, and
   rows of loops of staple fibers projecting from said batt and from said woven fabric,
   some of said loops include portions of said bundles of the continuous filaments with the color of the filaments interspersed with the color of the needled batt providing the floor covering with individual loops or clusters of loops of a color contrasting with the color of the fibers of the non-woven batt.

5. A floor covering comprising:
   a needled batt of non-woven staple fibers having a predetermined color,
   a woven fabric having warps comprised of bundles of continuous filaments having a color contrasting with the color of the staple fibers and having fillings of ribbon construction, said woven fabric being needled to a face surface of said batt to provide an obscuring cover on said woven fabric, and
   loops of staple fibers projecting from said batt and from said woven fabric,
   some of said loops include portions of said continuous filaments with the color of the filaments interspersed with the color of the needled batt providing the floor covering with individual loops or clusters of loops of a color contrasting with the color of the fibers of the non-woven batt.

6. A method of manufacturing a floor covering comprising:
   needling non-woven staple fibers into a batt,
   attaching a woven fabric to said batt by needle punching through the batt,
   said woven fabric having bundles of continuous filaments, ribbon yarns, or spun staple fibers in either the warp or in the filling direction,
   texturizing said non-woven fibers of said batt and said bundles of filaments, ribbon yarns, or staple fibers of said woven fabric to form closely adjacent rows of loops including individual loops or clusters of loops of contrasting color projecting above the plane of said batt, and
   applying a backing to the side of said batt opposite to said loops.

7. A method as claimed in claim 6 wherein said texturizing is performed by texturizing needles engaging said woven fabric prior to engaging said needled batt to form said loops on the opposite side of the batt from the woven fabric.

8. A method as claimed in claim 6 wherein said texturizing is performed by texturizing needles penetrating said batt prior to engaging said woven fabric to form loops on the same side of the batt that has the woven fabric attached thereto.

9. A method of manufacturing a floor covering comprising:
   needling non-woven staple fibers into a batt having a face surface and a back surface thereon,
   attaching a woven fabric to said face surface of said batt by needle punching through the back surface of the batt,
   said woven fabric having polypropylene ribbons in the warp direction and bundles of continuous filaments, ribbon yarns, or spun staple fibers in the filling direction,
   texturizing said non-woven fibers of said batt and said bundles of filaments, ribbon yarns, or staple fibers of said woven fabric to form closely adjacent rows of loops including individual loops or clusters of loops of contrasting color projecting above the plane of said woven fabric, and
   applying a backing to the back surface of said batt to secure said loops to said batt.

10. A method of manufacturing a floor covering comprising:

simultaneously needling non-woven staple fibers into a batt and attaching a woven fabric onto a face surface thereof with a covering layer of staple fibers formed on said woven fabric, said woven fabric having polypropylene ribbons in the warp direction and bundles of continuous filaments in the filling direction, texturizing said non-woven fibers of said batt and said bundles of filaments of said woven fabric to form closely adjacent rows of loops including individual loops or clusters of loops of contrasting color projecting above the plane of said woven fabric.

11. A method of manufacturing a floor covering as claimed in claim 10, wherein a backing is applied to a back surface of said batt to secure said loops to said batt.

* * * * *